United States Patent [19]

Auer

[11] 4,150,772

[45] Apr. 24, 1979

[54] PLANETARY WHEEL ADVANCE FOR A MELTABLE WELDING CABLE

[75] Inventor: Rupert Auer, Eching, Fed. Rep. of Germany

[73] Assignee: Messer Griesheim GmbH, Frankfurt am Main, Fed. Rep. of Germany

[21] Appl. No.: 807,401

[22] Filed: Jun. 17, 1977

[30] Foreign Application Priority Data

Jun. 24, 1976 [DE] Fed. Rep. of Germany ....... 2628386

[51] Int. Cl.² .............................................. B65H 17/20
[52] U.S. Cl. ..................................... 226/90; 414/432;
226/176; 226/181; 226/187; 226/188; 226/46
[58] Field of Search ............... 226/187, 186, 181, 176, 226/177, 90, 91, 168, 200, 46, 47, 188; 214/338, 339; 74/25; 228/41

[56] References Cited

U.S. PATENT DOCUMENTS

| 2,429,201 | 10/1947 | Connor et al. ...................... 214/338 |
| 3,599,498 | 8/1971 | Misenti ..................................... 74/25 |
| 3,744,694 | 7/1973 | Karnes et al. ........................ 226/168 |
| 4,049,172 | 9/1977 | Samokovliski et al. ......... 226/187 X |

FOREIGN PATENT DOCUMENTS 473996  3/1929  Fed. Rep. of Germany ........... 226/176

*Primary Examiner*—Bruce H. Stoner, Jr.
*Attorney, Agent, or Firm*—Connolly and Hutz

[57] ABSTRACT

A planetary wheel advance for a meltable welding cable includes planetary wheels clampable against the cable by a pressure arrangement with their axes being at an angle to the cable axis, with the wheels attached to one end of a two armed wheel holder lever hinged to a motor operated rotating support and movable by the pressure arrangement, and the pressure arrangement having a spring which reacts against the support and which exerts a definite force on the other lever arm to effect the clamping pressure.

11 Claims, 6 Drawing Figures

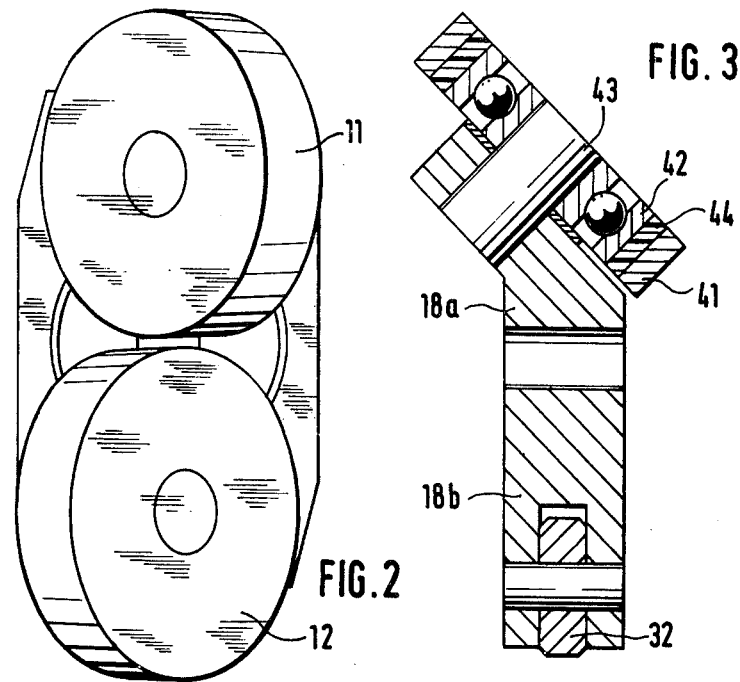
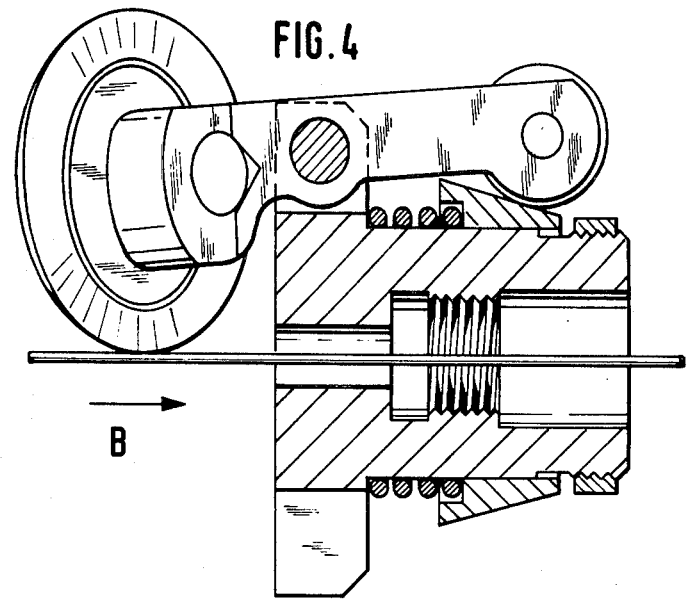

PLANETARY WHEEL ADVANCE FOR A MELTABLE WELDING CABLE

BACKGROUND OF THE INVENTION

The present invention is concerned with a planetary wheel advance for a meltable welding cable whose planetary wheels can be clamped against the cable by means of a pressure arrangement and their rotation axes form an angle with the axis of the cable, whereby the planetary wheels are attached to one end of a two arm wheel holder lever which is mounted on a rotating bearing or support and is movable by means of the pressure arrangement as well as being provided with a motor for the rotary motion of the support and the planetary wheels around the welding cable.

The state of the art for planetary wheel advances is exemplified by German Pat. Nos. DRP 514,759; DT-AS 2,125,441; BE-PS 705,047 as well as U.S. Pat. Nos. 1,733,836; 3,014,519 and 3,424,012.

An arrangement is disclosed in DRP 514,759, according to which the rotation axes of the planetary wheels can be adjusted with respect to the axis of the welding cable in order to change the rate of feed of the cable. The centering of the wheels with relation to the cable and also the clamping of the wheels to the cable is accomplished with screws and rubber discs or springs.

With this known arrangement, the disadvantage is that the centrifugal forces occurring with the spinning of the planetary wheels cause lifting of the wheels against the force of the rubber discs or springs. Since the centrifugal forces depend on the rotational speed, that is, on the cable advance rate, it is not assured that wheels are pressed against the electrode cable with a constant pressure during the advance of the electrode cable and that the rate of advance remains constant. But this is precisely an essential prerequisite for assuring trouble free feed of the cable.

With the arrangement according to BE-PS 705,047, in order to adjust the clamping force, a screw is provided by means of which two wheels fastened to levers and pivotable about the center of rotation, are attached. The adjustment of the various clamping forces with the adjusting screw provided inside the advance arrangement is, however, difficult and inaccurate.

According to U.S. Pat. No. 1,733,836, a planetary wheel advance is likewise provided whereby a pair of planetary wheels is supposed to serve for reverse motion of the welding rod, and where, futhermore the actuation of the wheels occurs depending on the arc-voltage. A disadvantage is the expensive and complicated adjustment mechanism for clamping both pairs of wheels on the electrode cable.

U.S. Pat. No. 3,014,519 also shows the complicated construction of the up to now known planetary wheel advances. It can be added to this, that also with this advance, the influence of the centrifugal forces is only to be avoided by means of the springs. This again, has the disadvantage that the spring forces must be designed and dimensioned according to the centrifugal forces expected. As a result of the spring constant and the various magnitudes of centrifugal forces with different rotation rates, the disadvantage exists that the wheels are pressed against the cable with different size forces.

Also the device disclosed in U.S. Pat. No. 3,424,012 is quite complicated in construction. The clamping of the wheels, with this device results by means of springs and screws, whereby a separate adjusting organ is associated with each wheel whereby the centering of the wheels in relation to one another as well as the precise adjustment of clamping forces is made more difficult. It can hereto be added that the spring loaded wheel is again sensitive to centrifugal forces and a precise and constant clamping pressure is thus not assured.

Beyond the above described devices, a planetary wheel advance is known from DT-OS 2,055,721 according to which the wheel holders are supported by one surface of an adjusting nut which can be turned about the welding cable. With this measure, it is accomplished that the centrifugal forces, which occur upon turning the planetary wheels about the welding cable to be advanced and which inhibit the positive locking between electrode cable and wheels, can no longer exercise any influence over the cable advance. This is especially made possible because the wheels are firmly supported during turning by the adjusting nut by means of the slidable wheel holders and as a result, it is avoided that an individual planetary wheel could lift from the cable on account of centrifugal forces. Practice has shown, however, that with such advance mechanisms, the setting of the clamping force in other words the turning of the adjusting nut must constantly be done by hand and thus depending on the skill of the welder the rollers are squeezed against the cable with sometimes more and sometimes less than correct clamping pressure.

SUMMARY OF THE INVENTION

Proceeding from the above mentioned state of the art, it is an object of the invention to achieve a planetary wheel advance of the above type the construction of which is simple and with which a reproducable adjustment of the required clamping force of the wheels on the cable is possible at any time and beyond this whereby resulting centrifugal forces forming during turning of the wheels has no adverse effect on the advance of the cable.

To achieve this object it is proposed according to the invention that the pressure arrangement include a spring which is supported by the rotating support on one side and which from its other side exerts on the other lever a definite force which produces the clamping pressure of the rollers.

As an advantageous further development between the spring and the lever arm and on the support a conical tightening ring is placed so as to be slidable, a face of which is in working contact with the spring and the conical surface of which is in contact with the lever arm.

As a result of the proposed outfitting of the planetary wheel advance according to the invention the above mentioned object is achieved in an especially purposeful fashion. Thus, for example, a particularly simple and space saving construction of the entire device is achieved by means of the invention.

It is furthermore of essential significance that because of the pressure arrangement the planetary wheels are on account of the spring force uniformly pressed against the cable with a pressure depending on the force of the spring, so that a reproducable adjustment of the clamping pressure and therewith a constant rate of advance becomes possible.

According to the invention the clamping which is solely dependent on the spring's force and during operation, the feed of the cable are made possible because the conical tightening ring has a self locking cone angle which is preferably in the range of 8° to 22°.

By a self-locking conical angle is understood to mean an angle at which the forces are exerted on the conical tightening ring by the centrifugal force of the revolving levers, which are not movable against the force of the spring; the conical tightening ring is in this case self-locking. The centrifugal forces thus, advantageously, exerts no influence over the feed of the cable or rod.

The achieved reproducable adjustability of the roller clamping is important so that a welding cable with a diameter of, for example, 1.0 mm, is steadily fed with a constant rate of feed, drawn from different delivery rolls one after the other, into the welding arrangement and brought to the welding location. The planetary wheels must be moved away for a short time in direction opposite the clamping direction when changing delivery rolls for simple threading of the cable into the advance. After threading of the cable, the planetary wheels must be brought again to their original position. This movement can be accomplished according to the invention in an especially simple way with a nut coupled to the threading of the support by means of which the conical tightening ring is movable against the force of the spring and the self-locking effect. For threading purposes the nut is pressed against the conical tightening ring and causes lifting of the spring's force. After successful threading, the nut is returned to free setting again so that the wheels are pressed against the welding cable with the predetermined unaltered pressure.

THE DRAWINGS

FIG. 2 is a side view in the direction of the arrow A according to FIG. 1;

FIG. 3 is a cross-sectional view of a wheel holder with planetary wheel from the illustrative example in FIG. 1;

FIG. 4 illustrates a further planetary wheel advance, according to the invention, in an arrangement having three planetary wheels only one of which is shown;

DETAILED DESCRIPTION

Figure 1:
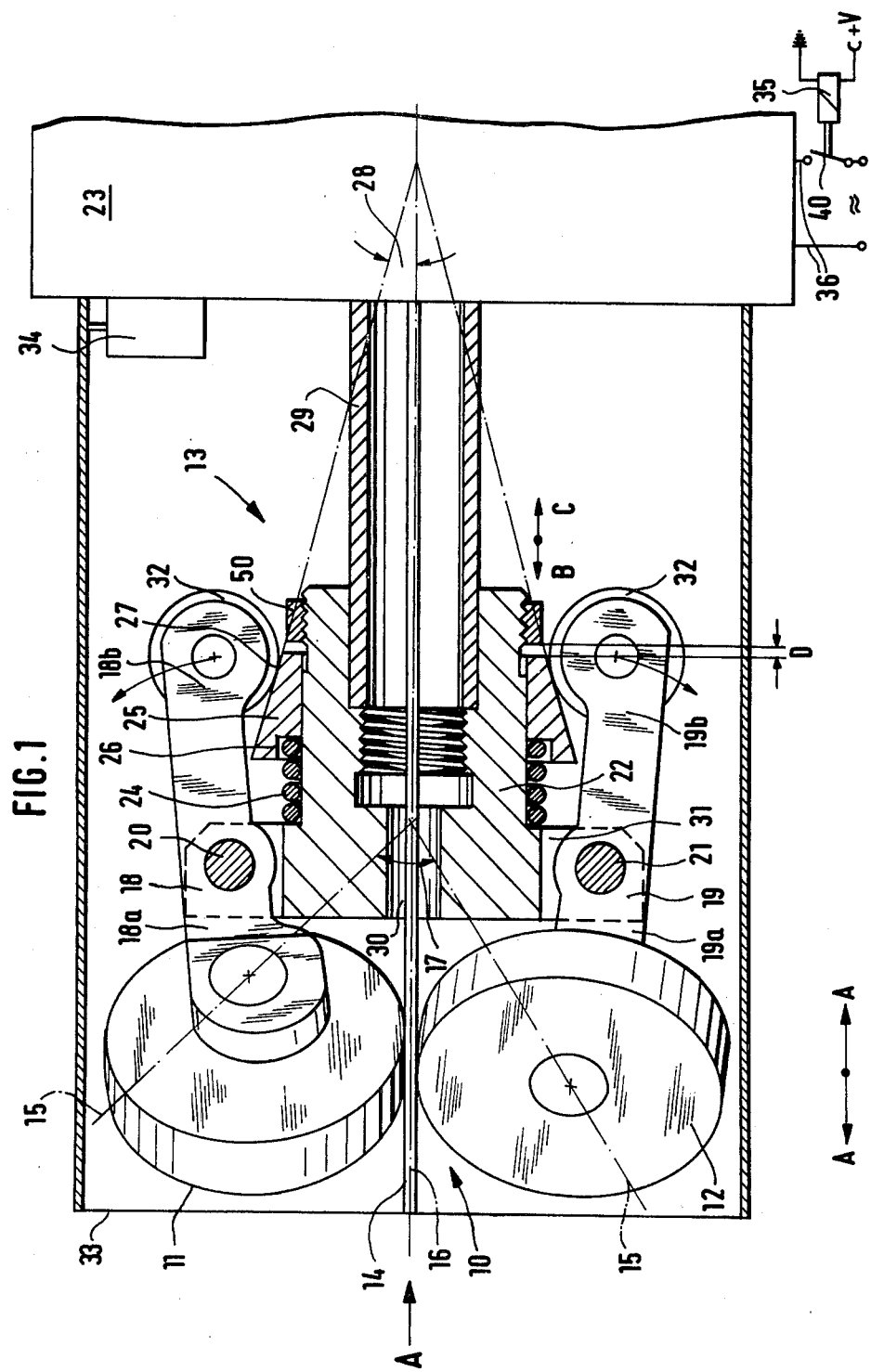
FIG. 1 shows in cross-section one example of a planetary wheel advance according to the invention with two planetary wheels.

The planetary wheel advance 10 according to FIGS. 1 to 3 includes planetary wheels 11, 12 which are clampable against the welding cable or wire 14 by means of a pressure arrangment 13. The axes of rotation 15 of the planetary wheels 11, 12 form an angle 17 with the axis 16 of the cable 14. The wheels 11, 12 are at one end 18a, 19a of two armed wheel holder levers 18, 19 which are movable about the centers of rotation 20, 21 and are connected to a rotating bearing or support 22. The advance motor is marked 23.

According to the invention, the pressure arrangement 13 includes a spring 24 which rests on the one side against the rotating support 22 and on the other side exerts definite force on the other lever arm 18b, 19b which in turn effects the clamping pressure of the wheels 11, 12 against the cable 14. A conical tightening ring 25 is located, preferably between the spring 24 and the lever arm 18b on the rotating support 22 so as to be slidable in the direction of the double arrows A—A. The one face 26 of the conical tightening ring 25 serves for resting against the spring 24 while the conical surface 27 is in working contact with the lever arm 18b and 19b. Associated with the conical tightening ring is a nut 50 which is further screwed onto the rotating support 22. The cone angle causes self-locking and lies in the range of 8° to 22°.

The conical surface 27 of the conical tightening ring 25 is thereby inclined toward a motor shaft 29. The motor shaft 29 is designed as a tubular shaft and is in firm, non-slip connection with the rotating support 22.

The support 22 contains a center bore 30 for passing the cable through it and further includes slits 31 running parallel to the axis 16 of the cable 14 for mounting the wheel holders 18, 19. The one lever arm (18a, 19a) of the wheel holder 18, 19 is bent according to the angle between the rotation axis and the cable axis in order to support the planetary wheels. At the other end are located guide rollers 32 in order to reduce friction which are in contact with the conical surface 27 of the conical tightening ring 25.

According to a further proposal of the invention, the components which revolve about the cable 14 (motor shaft 29, pressure arrangement 13, support 22 with the wheel holders 18 and 19 as well as the wheels 11 and 12) are surrounded by a protective cover 33 which does not rotate along. A protective breaker switch 34 is associated with the protective cover 33 which interrupts the flow of electrical energy to the advance motor 23 upon removal of the cover 33. Additionally, for example, the protective breaker switch 34 is designed as microswitch which disengages a relay 35 which in turn opens the contact 36 in the current supply for the advance motor 23 upon removal of the cover 33. Additionally, for example, the protective breaker switch 34 is designed as microswitch which disengages a relay 35 which in turn open the contact 36 in the current supply for the advance motor 23 upon removal of the cover 33.

Figure 5:
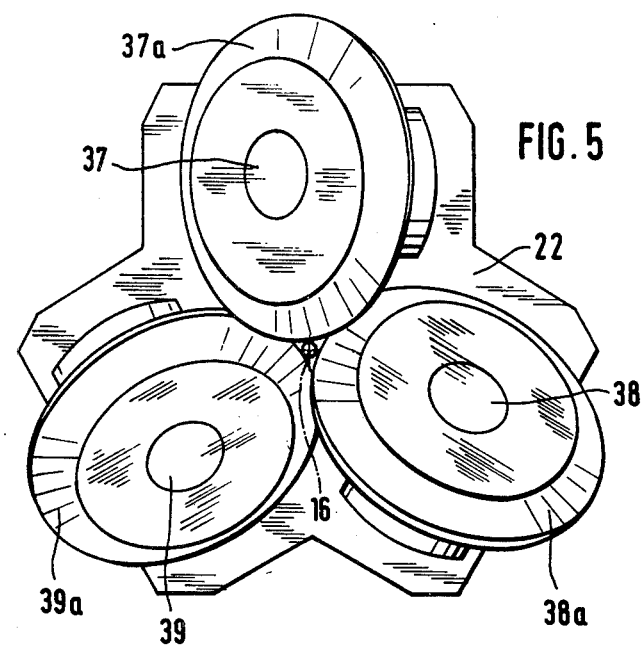
FIG. 5 is a side view in the direction of arrow B according to FIG. 4.
Figure 6:
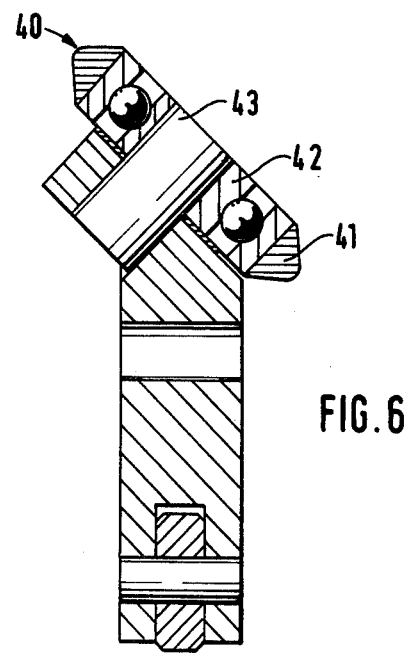
FIG. 6 illustrates the wheel holder with planetary wheel according to the illustrative example according to FIG. 4.

In the illustrative example according to FIGS. 1 to 3, two planetary wheels are provided. According to a further proposal of the invention, it is proposed that three wheel holding levers 37, 38, 39 be mounted onto the support 22 symmetrically around the axis of the cable. This embodiment of the invention is illustrated in FIGS. 4 to 6, from which the symmetrical grouping of the three planetary wheels 37a, 38a and 39a can be seen especially clearly. The individual components in the illustrative example according to FIGS. 4 to 6 correspond, except for the design of the planetary wheels, to the components of the illustrative example according to FIGS. 1 to 3, and like reference numerals are thus used for like parts.

With regard to the advance rollers it is determined that in the embodiment of FIGS. 1 to 3, the advance rollers exhibit a hyperboloid outer profile, while in the embodiment of FIGS. 4 to 6, the outer profile is designed so as to be rounded and provided with a greater or lesser radius 40. The wheel hubs 41 are, thereby, attached to the wheel holder with ball bearings 42 and dowel pins 43 (see FIGS. 2 to 5). With the planetary wheel advance with two hyperboloid outer profile exhibiting planetary wheels, the wheel hub 41 is thereby either directly pressed on a ball bearing or connected to a normal ball bearing by means of an elastic intermediate ring 44 so that various sizes of roller adjustment angles with different cable diameters can be equalized.

The method of operation of the invention's advance drive is as follows:

In order to thread the cable 14, the nut 50 is turned in the direction of the arrow B and displaced against the force of the spring 24 until the levers 18, 19 are movable away from each other so that the cable 14 can simply be slid in between the wheels 11, 12.

Then, the nut is moved in the direction of the arrow C until a small distance (see FIG. 1) is present between the nut 50 and the conical tightening ring 25. The spring 24 is presently pressing the cone 25 against the lever ends 18b, 19b so that these are pressed apart and thus the wheels 11, 12 are pressed against the cable 14 with a force determined by the spring. The advance of the cable is then achieved by switching on the motor 23.

What is claimed is:

1. A planetary wheel feed mechanism for advancing a meltable welding wire including a hollow motor shaft through which the wire is advanced, a pressure arrangement mounted on said shaft for rotation therewith, said pressure arrangement including a bearing support mounted on said shaft, a plurality of levers mounted to said bearing support parallel to the wire axis, each of said levers having a mounting arm at one end thereof and a bearing arm on the opposite end thereof, a feed wheel secured to each mounting arm of said levers against the wire with said wheels helically disposed with respect to the wire axis whereby rotation of said levers cause said wheels to advance the wire, a conical tensioning ring mounted on said bearing support, each of said levers having its said bearing arm disposed against said tensioning ring for moving said wheels against the wire in such a manner that the wire is advanced independently of the centrifugal force of said rotating levers, and said tensioning ring being longitudinally movable to cause said levers to pivot.

2. Feed mechanism according to claim 1, characterized in that said conical tensioning ring is resiliently supported against said bearing support.

3. Feed mechanism according to claim 2, characterized in that said conical tensioning ring is slidably supported on said bearing support, and the one front side of said conical tensioning ring in its operating connection having a spring reacting thereagainst.

4. Feed mechanism according to claim 1, characterized in that said conical tensioning ring has a self-locking cone angle.

5. Feed mechanism according to claim 4, characterized in that said cone angle is between 8° and 22°.

6. Feed mechanism according to claim 1, characterized in that said bearing support contains a center bore for guiding the welding wire therethrough and has slots running parallel to the wire axis, and said levers being located in said slots.

7. Feed mechanism according to claim 1, characterized in that a guide roll is mounted on each of said bearing arms in contact with said conical tensioning ring.

8. Feed mechanism according to claim 1, characterized in that said plurality of levers comprises two levers mounted symmetrically around the wire axis on said bearing support.

9. Feed mechanism according to claim 1, characterized in that the rotating parts thereof including said wheels and said levers and said support are encased in a stationary protective cover.

10. Feed mechanism according to claim 9, characterized in that said protective cover is provided with a safety switch which interrupts the supply of electrical energy to the feed motor when said cover is removed.

11. Feed mechanism according to claim 1, characterized in that pressure applying means urges said tensioning ring away from said wheels.

* * * * *